(12) United States Patent
Felke et al.

(10) Patent No.: US 10,325,383 B2
(45) Date of Patent: Jun. 18, 2019

(54) AUTOMATED CONSTRUCTION OF DIAGNOSTIC FAULT MODEL FROM NETWORK DIAGRAM

(71) Applicant: Honeywell International Inc., Morristown, NJ (US)

(72) Inventors: Tim Felke, Glendale, AZ (US); Jeff van der Zweep, Peoria, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 1431 days.

(21) Appl. No.: 14/060,657

(22) Filed: Oct. 23, 2013

(65) Prior Publication Data
US 2015/0109306 A1    Apr. 23, 2015

(51) Int. Cl.
*G06G 7/48*    (2006.01)
*G06T 11/20*    (2006.01)

(52) U.S. Cl.
CPC .................. *G06T 11/206* (2013.01)

(58) Field of Classification Search
CPC .................................................. G06T 11/206
USPC ............................................................. 703/7
See application file for complete search history.

(56) References Cited

U.S. PATENT DOCUMENTS

| | | | |
|---|---|---|---|
| 7,536,284 B2 * | 5/2009 | Linzey | G06Q 10/04 361/42 |
| 7,636,622 B2 | 12/2009 | Underdal et al. | |
| 7,665,071 B1 * | 2/2010 | Roles | H04L 41/0233 717/104 |
| 2006/0107158 A1 * | 5/2006 | Mishra | G06F 17/504 714/741 |
| 2011/0063424 A1 * | 3/2011 | Matsuhiro | H04N 13/0434 348/58 |
| 2012/0232743 A1 | 9/2012 | Singh | |
| 2012/0233112 A1 | 9/2012 | Rajpathak et al. | |
| 2012/0233132 A1 | 9/2012 | Rajpathak | |

OTHER PUBLICATIONS

Wang et al. (A Benchmark diagnostic Model Generation System, 2008 (21 pages)).*
Liggesmeyer et al., "Improving System Reliability with Automatic Fault Tree Generation", "Twenty-Eight Annual International Symposium on Fault-Tolerant Computing", Jun. 23-25, 1998, pp. 1-10, Publisher: IEEE, Published in: DE.

* cited by examiner

*Primary Examiner* — Andre Pierre Louis
(74) *Attorney, Agent, or Firm* — Fogg & Powers LLC

(57) ABSTRACT

A method of automatically generating a fault model from a network diagram comprising parsing a network diagram to identify schematic components and schematic interfaces, mapping each schematic component to a respective standard component, and mapping each schematic interface to a respective standard interface, generating component failure information for each schematic component based on the respective standard component, wherein component failure information includes standard failure modes of the respective standard component, generating interface failure information for each schematic interface based on the respective standard interface, wherein interface failure information includes standard failure modes of the respective standard interface, and constructing a fault model specific to the network diagram based on component failure information and interface failure information.

20 Claims, 10 Drawing Sheets

AUTOMATED CONSTRUCTION OF DIAGNOSTIC FAULT MODEL FROM NETWORK DIAGRAM

BACKGROUND

Manual construction of fault models used to automate troubleshooting of complex systems is an expensive, time consuming, and error prone activity. The cost of this activity has been a significant obstacle to the deployment of automated diagnostic systems.

SUMMARY

In one embodiment a method of automatically generating a fault model from a network diagram is provided. The method comprises parsing a network diagram to identify schematic components and schematic interfaces. Each schematic component is mapped to a respective standard component, and each schematic interface is mapped to a respective standard interface. Component failure information is generated for each schematic component based on the respective standard component, wherein component failure information includes standard failure modes of the respective standard component. Interface failure information is generated for each schematic interface based on the respective standard interface, wherein interface failure information includes standard failure modes of the respective standard interface. A fault model is constructed specific to the network diagram based on the component failure information and interface failure information.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
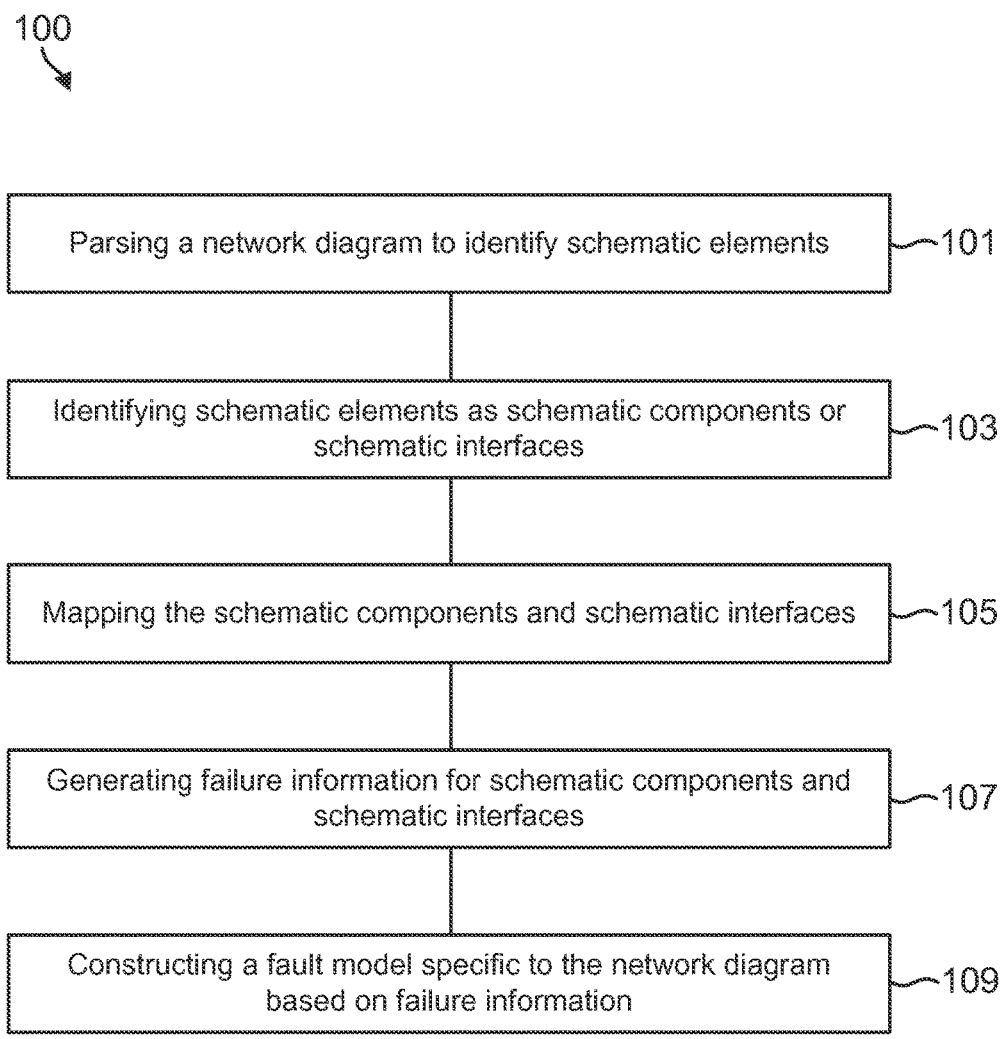
FIG. 1 is a block diagram of an exemplary method of automatically generating a fault model from a network diagram.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The construction of the fault models can be automated based on the content of schematic drawings, standardized lists of failure modes for each type of component and interface, fault reporting standards for the systems on the vehicle, and other engineering design data, as described in the embodiments below.

FIG. 1 illustrates a block diagram of an exemplary method for automatically generating a fault model form a network diagram 100. At block 101, a network diagram is parsed to identify schematic elements. In one embodiment, a network diagram is a schematic for an electronic circuit. In another embodiment, the network diagram is a schematic for a pneumatic system. The network diagram can be any diagram depicting discrete components and their interfaces. Network diagrams include, but are not limited to: electrical schematics, electronic schematics, circuit diagrams, block diagrams depicting electrical or electronic systems, diagrams of pneumatic systems, diagrams of thermal systems, diagrams of mechanical systems, or combinations thereof. Interfaces include, but are not limited to, physical connections, relationships, and circuits. The components and interfaces of the network diagram are identified as schematic elements.

At block 103, the schematic elements are then identified as either schematic components or schematic interfaces. At block 105, the schematic components and schematic interfaces are mapped to indicate their relationships. The schematic components are mapped to standard components and component types. The schematic component is a specific instance of a component in a network diagram. The schematic component is mapped to a standard component, where the standard component is a standard version of the specific schematic component. The standard component is in turn mapped to a component type. In one embodiment a schematic component may be a programmable controller named Programmable Controller #3 having an associated set of technical specifications. Technical specifications of a schematic element describe the specific characteristics of a schematic element, which may vary between manufacturers or between different models. Technical specifications can include, but are not limited to specific configurations, build materials, operating conditions, and tolerances. Programmable Controller #3 is mapped to an associated standard component having name PC-20, where the standard component associated with Programmable Controller #3 has common inputs and outputs, and a range of characteristics that include the technical specifications of Programmable Controller #3 and other programmable controllers that have the same configuration or perform the same kind of functions as Programmable Controller #3. Likewise, schematic interfaces are mapped to standard interfaces and interface types. In one embodiment, each of the standard components and standard interfaces are mapped to an associated set of standard failure modes and standard tests. Standard tests include, but are not limited to diagnostic procedures, service procedures, test parameters and symptoms, relationships between test parameters, and other procedures related to the standard failure mode and associated standard component or interface. Standard tests are any procedure which can be used to identify or fix associated standard failure modes. Component types and interface types are also mapped to associated standard failure modes.

At block 107, failure information for schematic components and schematic interfaces are generated. Respective failure information is linked to each schematic component and schematic interface and includes standard failure modes for each respective standard component and component type, and respective standard interface and interface type. In one embodiment, the failure information includes standard tests, affected functions, and other information related to the standard failure mode.

At block 109, the failure information is used to construct a fault model specific to the network diagram. The failure information is mapped to the respective schematic components and schematic interfaces. In one embodiment, the failure information is mapped to imported specifications, operating conditions, schematics, various test parameters, readings from components, measurements along interfaces, inputs and outputs of the system, and symptoms and failures. Test parameters, symptoms, and failures may be supplied manually by technicians via testing and/or entering of service records, or automatically supplied by self-reporting or self-diagnosing systems. In one embodiment, the fault model illustrates the relationship between the schematic components, schematic interfaces, failure modes, symptoms, affected functions, and test results. In other embodiments, the fault model also provides specific diagnostic procedures, solutions, and fixes for the failure modes in the fault model.

Figure 2A:
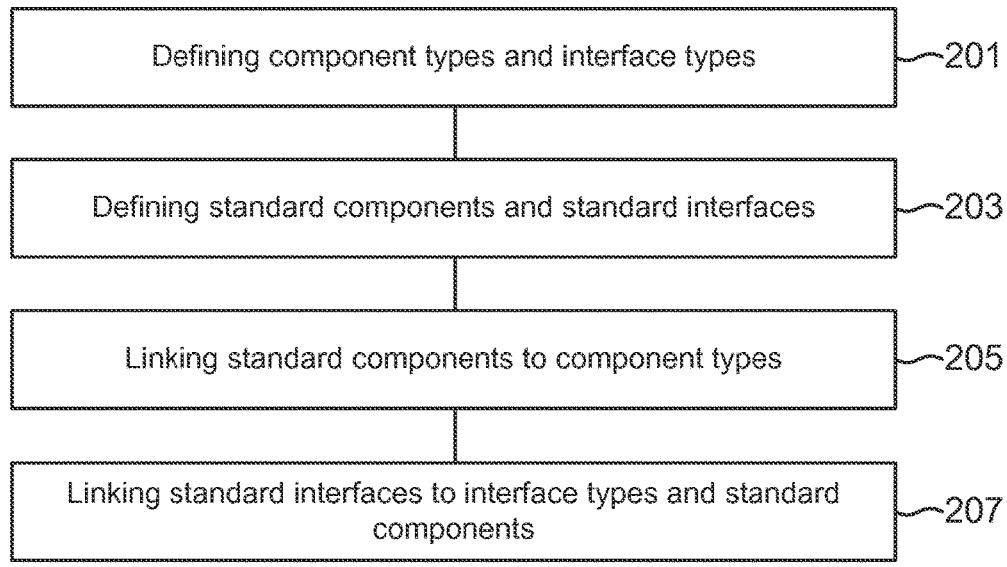
FIG. 2A is a block diagram of an exemplary method for defining and linking component types, interface types, standard components, and standard interfaces.

FIG. 2A illustrates a block diagram for defining and linking component types, interface types, standard components, and standard interfaces 200A in an exemplary method for automatically generating a fault model from a network diagram. At optional block 201, the component types and interface types to be used are defined. In one embodiment, component types and interface types are defined in a pre-populated database. In other embodiments, component types and interface types are defined by a user, or added by a user to a pre-existing database. In yet other embodiments, component types and interface types are defined by a network diagram, or multiple network diagrams from which a collection of component types and interface types are compiled.

At optional block 203, standard components and standard interfaces are defined. In one embodiment, the standard components and standard interfaces are defined in a pre-populated database. In other embodiments, standard components and standard interfaces are defined by a user, or added by a user to a pre-existing database. In yet other embodiments, standard components and standard interfaces are defined by a network diagram, or multiple network diagrams from which a collection of standard components and standard interfaces are compiled.

At block 205, standard components are linked to component types. At block 207, standard interfaces are linked to interface types, and standard components. Standard interfaces may be linked to standard components where a standard component may require a certain standard interface. Standard components and interfaces are generic instances of specific components and interfaces. In one embodiment, standard components and interfaces include the specific components or interfaces that differ in technical specification between different manufacturers, or different models. In other embodiments, the standard element can refer to a standard version of the specific element that is produced to have the same technical specifications or characteristics within a tolerance range. Component types and interface types are identify the type of component or interface. That is to say, two different standard components may have the same component type, and two different standard interfaces may have the same interface type. For illustrative purposes, a list of electrical interface types can include, but are not limited to: ground, high reference line, low reference, analog output, command signals, drive signal, PWM signal, etc. An exemplary list of hydraulic interface types can include, but is not limited to: supply, return, modulated, sensed, etc.

Figure 2B:
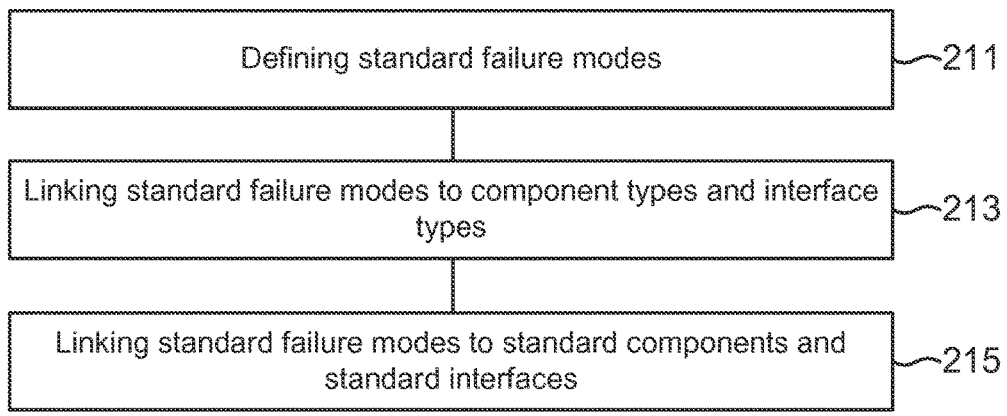
FIG. 2B is a block diagram of an exemplary method for defining and linking standard failure modes.

FIG. 2B illustrates a block diagram for defining and linking standard failure modes to component types, interface types, standard components and standard interfaces 200B. At optional block 211, standard failure modes are defined. In one embodiment, standard failure modes are defined in a pre-populated database. In other embodiments, standard failure modes are defined by a user, or added by a user to a pre-existing database. In yet other embodiments, failure modes are defined by network diagrams, specifications for components, networks, circuits and interfaces, service procedures, service records, or any combination thereof from which a collection of standard failure modes are compiled.

At block 213, standard failure modes to linked to component types and interface types. At block 215, standard failure modes are linked to standard components and standard interfaces. In one embodiment, standard components and standard interfaces may have standard failure modes associated with them in addition to the standard failure modes of the associated component type or interface type, and vice versa.

Figure 2C:
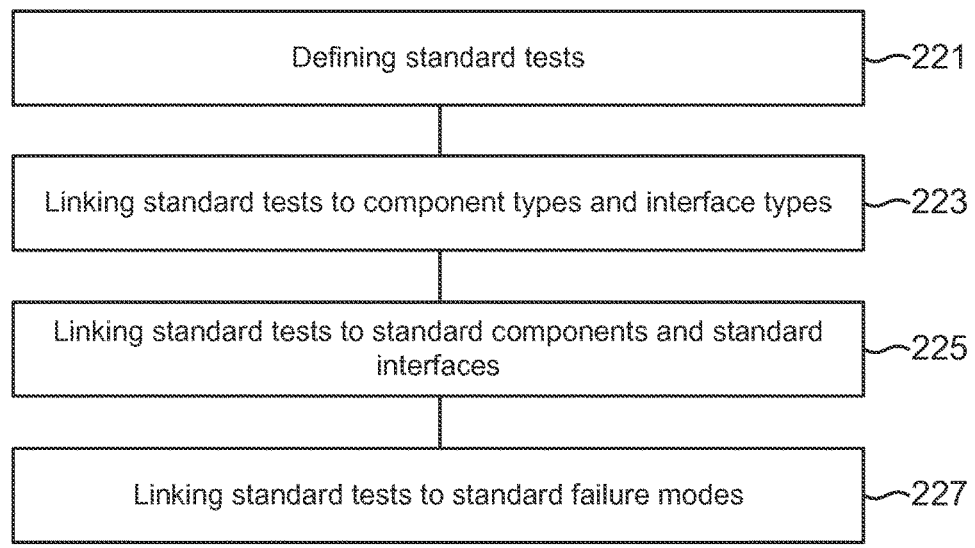
FIG. 2C is a block diagram an exemplary method of defining and linking standard tests.

FIG. 2C illustrates a block diagram for defining and linking standard tests to component types, interface types, standard components, standard interfaces and standard failure modes 200C. At optional block 221, standard tests are defined. In one embodiment, standard tests are defined in a pre-populated database. In other embodiments, standard tests are defined by a user, or added by a user to a pre-existing database. In yet other embodiments, standard tests are defined by network diagrams, specifications for components, networks, circuits and interfaces, service procedures, service records, or any combination thereof from which a collection of standard tests are compiled.

At block 223, the standard tests are linked to component types and interface types. At block 225, the standard tests are linked to standard components and standard interfaces. In one embodiment, standard components and standard interfaces may have standard tests linked to them that are different from the standard tests linked to their associated component types and interface types. In other embodiments, component types and interface types may have linked standard tests that are not found in an associated standard component or standard interface. Thus, the standard test links not only to a local component or interface, but to related elements. At block 227, the standard tests are linked directly to the standard failure modes. In one embodiment, a standard failure mode may have one or more associated standard tests that are not found in the component type, interface type, standard component, or standard interface associated with the standard failure mode. A standard test can detect failure modes in the same element in which the test is being run, and it can detect and link to failure modes found in other elements through with the element is connected. Thus, the test can detect not only local failure modes, but also failure modes at remote elements connected via a common interface.

Figure 2D:
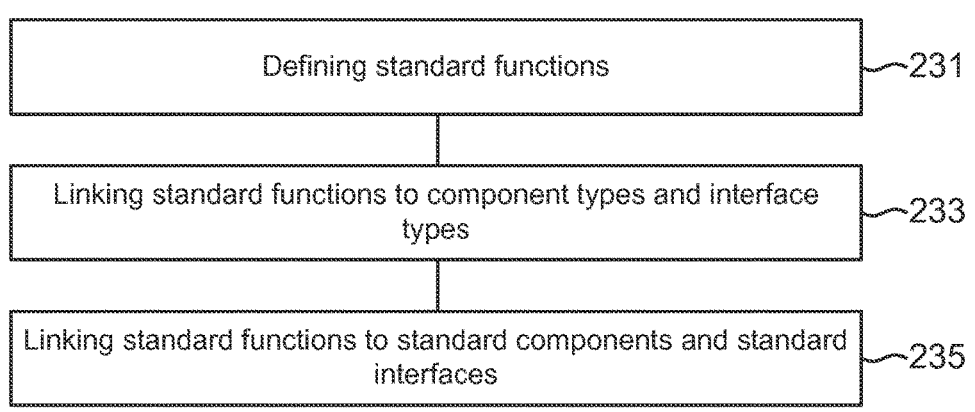
FIG. 2D is a block diagram an exemplary method of defining and linking standard functions.

FIG. 2D illustrates a block diagram for defining and linking standard functions to component types, interface types, standard components, standard interfaces and standard failure modes 200D. At optional block 231, standard functions are defined. Standard functions define the function of a component, interface, standard component, standard interface, component type, or interface type. In one embodiment, standard functions are defined in a pre-populated database. In other embodiments, standard functions are defined by a user, or added by a user to a pre-existing database. In yet other embodiments, standard functions are defined by network diagrams, specifications for components, networks, circuits and interfaces, service procedures, service records, or any combination thereof from which a collection of standard tests are compiled.

At block 233, the standard functions are linked to component types and interface types. At block 235, the standard functions are linked to standard components and standard interfaces.

Figure 2E:
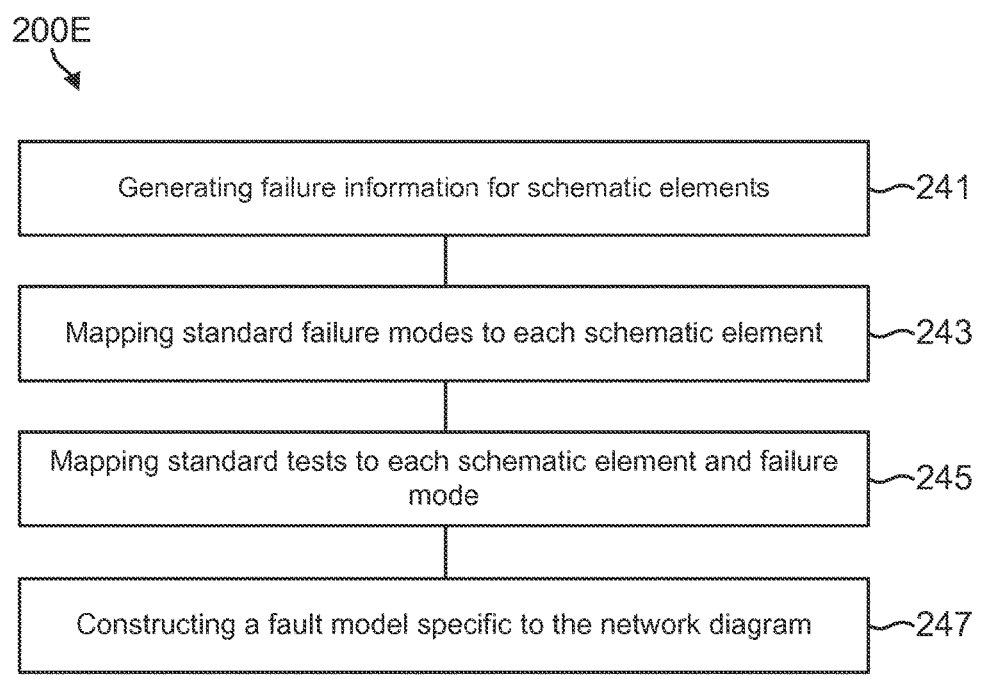
FIG. 2E is a block diagram of an exemplary method of generating failure information.

FIG. 2E illustrates a method of generating failure information 200E as part of an exemplary method for automatically generating a fault model. At block 241, failure information is generated for each schematic element, where the schematic element is a schematic component or schematic interface. The schematic element has previously been linked to a corresponding standard component or standard interface, which is in turn linked to a component type or interface type. The technical specification of the schematic element has also previously been mapped to the corresponding standard component or standard interface. In one embodiment, failure information for a schematic element includes standard failure modes, standard tests, affected functions, repair procedures, and supplementary records, such as service records and operator complaints, where supplementary records may or may not be inherently linked with the component type and standard component, or interface type and standard interface before generating the failure information.

At block 243, standard failure modes are mapped to each schematic element. The standard failure modes are mapped to the schematic element to correspond to the technical specifications of the schematic element. In one embodiment, specific instances of failure parameters of a failure mode are linked to the schematic element specifications. The failure parameters are then linked to the standard failure mode, thus mapping the standard failure mode to the schematic element with failure parameters as tailored to the schematic element. Failure parameters include, but are not limited to, any signals, outputs, readings, reports, operation, or other indication of a failure that occurs in a failure mode.

At block 245, standard tests are mapped to each schematic element. The standard tests are mapped to the schematic to correspond to the technical specifications of the schematic element. In one embodiment, specific test parameters or results are mapped to schematic element specifications and to a standard test. Thus, the standard tests are mapped to a specific schematic element with test parameters tailored to the schematic element. Thus the test can detect failure modes in the same element in which the test is being run, and it can detect and link to failure modes found in other elements through with the element is connected. Thus, the test can detect not only local failure modes, but also failure modes at remote elements connected via a common interface.

At block 247, a fault model is constructed specific to the network diagram. The fault model contains all of the failure information as mapped to the schematic elements. Thus, the fault model provides information that includes, but is not limited to, failure modes, tests, diagnostic procedures, repair procedures, affected functions, and dependencies mapped to the technical specifications of the schematic elements.

It is to be understood that FIGS. 2A through 2E depict exemplary embodiments and that it is not necessary to perform the method in the order in which the blocks are presented. Therefore, FIGS. 2A through 2E, and the above description are not to be taken in a limiting sense.

Figure 3A:
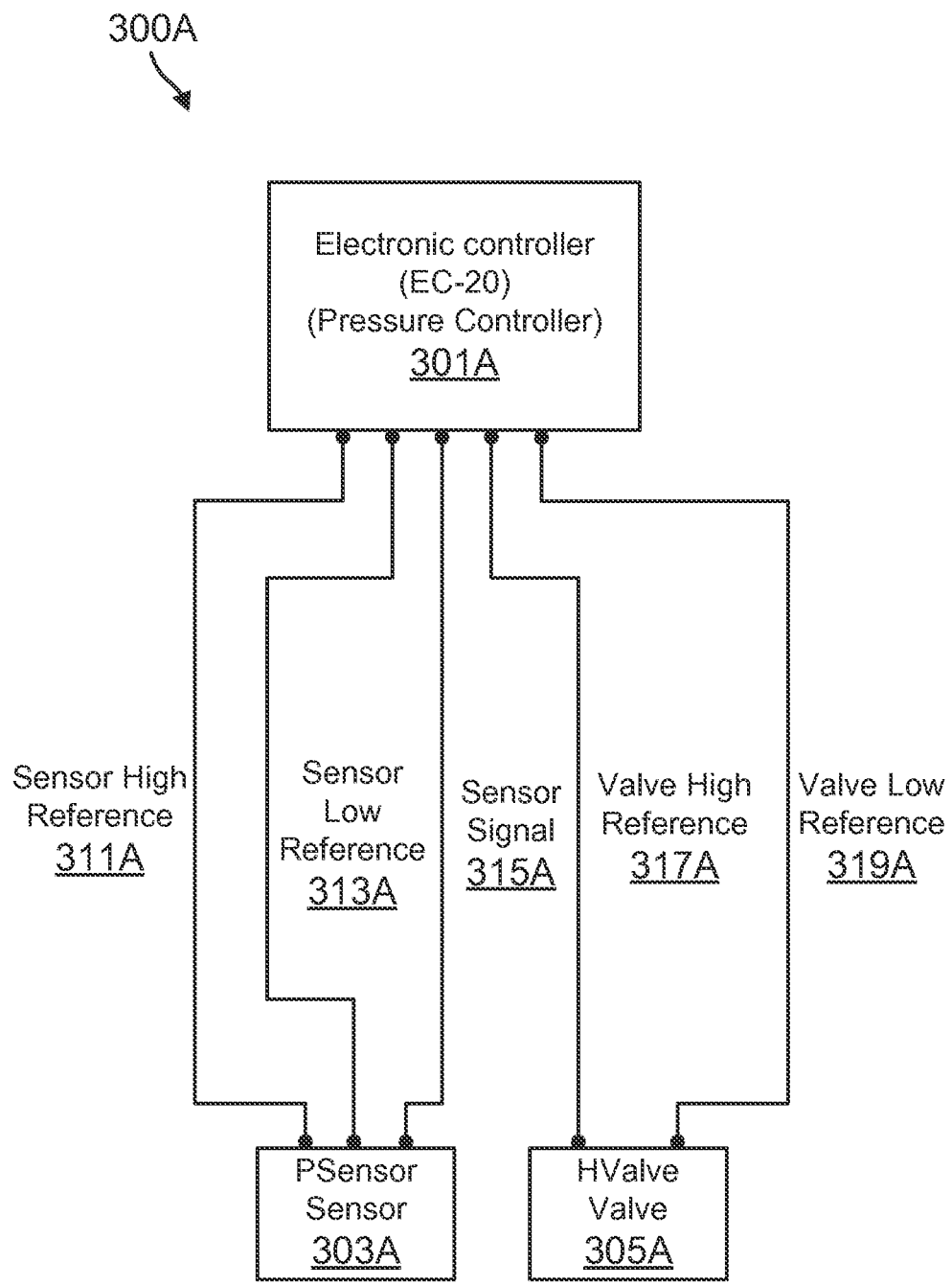
FIG. 3A illustrates an exemplary network diagram.

FIG. 3A illustrates an exemplary network diagram 300A. The network diagram 300A comprises schematic components and schematic interfaces. The schematic components comprise an electronic controller 301A, sensor 303A, and valve 305A. Schematic interfaces comprise Sensor High Reference 311A, Sensor Low Reference 313A, Sensor Signal 315A, Valve High Reference 317A, and Valve Low Reference 319A. Electronic controller 301A is coupled to sensor 303A via the schematic interfaces sensor high reference 311A, sensor low reference 313A, and sensor signal 315A. Electronic controller 301A is coupled to valve 305A via the schematic interfaces valve high reference 317A, and valve low reference 319A. Electronic controller 301A is a specific electronic controller labeled "Pressure Controller," with a set of associated technical specifications. Pressure Controller is linked to, and has standard component EC-20. The standard component EC-20 has a component type of electronic controllers. In other embodiments, the component type may be a more specific type of electronic controller, such as an engine control unit in an automobile, and may be narrowed or broadened to suit a particular system, as can be determined by a person having ordinary skill in the art. Similarly, sensor 303A has element name "PSensor," and Valve 305A has element name "HValve." In one embodiment, interface 311A sensor high reference has standard interface SH-1, and has an interface type high reference. Interface 313A sensor low reference has standard interface SL-2, and has interface type low reference. Interface 315A sensor signal has standard interface Signal-1, and has interface type analog value. Interface 317A valve high reference has standard interface VH-1, and interface type high reference. Interface 319A valve low reference has standard interface VL-2, and corresponding interface type low reference. In some embodiments, the component types, interface types, standard components, and standard interfaces may be found in a standard database, lookup table, or list. In other embodiments, the component types, interface types, standard components, and standard interfaces may be user definable.

Figure 3B:
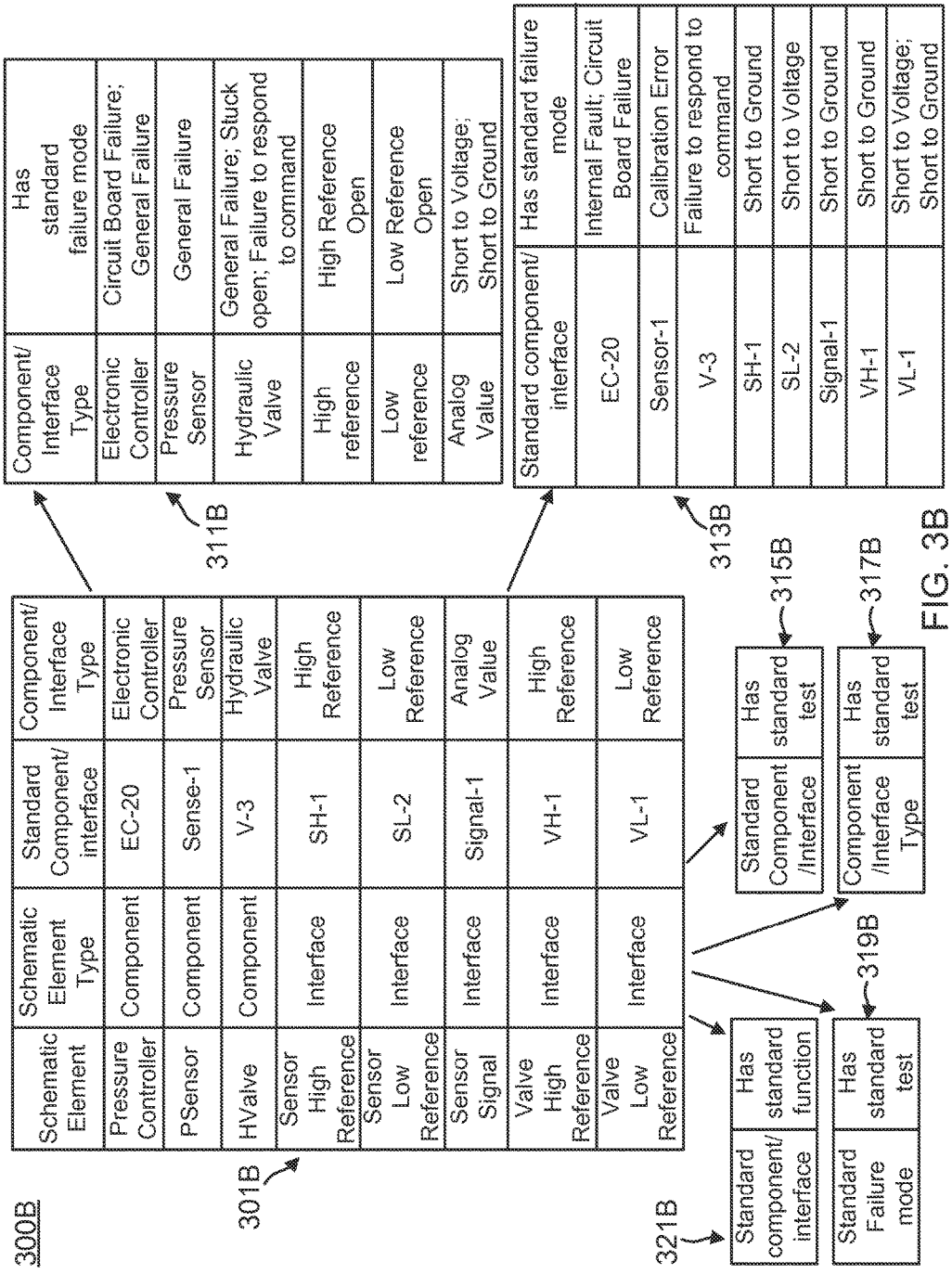
FIG. 3B illustrates an exemplary process for gathering and linking failure information from the network diagram of FIG. 3A.

FIG. 3B illustrates an exemplary process for gathering and linking failure information 300B from the network diagram of FIG. 3A, depicting associated information in list form. At table 301B, the schematic elements from network diagram 300A are identified by their name. The schematic elements are classified as either components or interfaces. Based on the classification and specifications of the element, the each schematic element is linked to a respective standard component, or standard interface. Each standard component or standard interface is further linked to a broader category of component types or interface types.

At table 311B, each of the component types and interface types linked to the schematic elements has a list of linked standard failure modes, which are in turn also linked to the schematic elements. Component type electronic controller has standard failure modes circuit board failure and general failure. Pressure sensor type components have the single standard failure mode of general failure. Hydraulic valve component types have general failure, stuck open, and failure to respond to command standard failure modes. High reference interface types have the standard failure mode high reference open. Low reference interface types have standard failure mode low reference open. Analog interface type has standard failure modes short to voltage and short to ground.

At table 313B, each of the linked standard components and standard interfaces linked to the schematic elements has a list linked failure modes, which are in turn also linked to the schematic elements. For example, the standard component of pressure controller, "EC-20," has standard failure modes internal fault and circuit board failure. Thus, standard component "EC-20" has standard failure modes in common with, and standard failure modes in addition to the standard failure modes of the component type "Electronic Controllers." This is also true of the standard interfaces and their respective interface types. Standard components and standard interfaces may have standard failure modes associated with them in addition to the standard failure modes of the associated component type or interface type, and vice versa.

The standard failure modes for each of the component types, interface types, standard components, and interface components are compiled and mapped to the schematic elements in the automatic generation of the fault model.

Table 315B shows standard tests that are linked to each of the standard components and standard interfaces, which are collected and linked to the schematic elements. At table 317B, standard tests associated with component types and interface types are collected and linked to the schematic elements. At table 319B, standard tests directly linked to the standard failure mode, independent of the component/interface type or standard component/interface are collected and linked to the schematic elements. A standard test can detect failure modes in the same element in which the test is being run, and it can detect and link to failure modes found in other elements through with the element is connected. Thus, the test can detect not only local failure modes, but also failure modes at remote elements connected via a common interface. For example, the electronic controller 301A can have a test that detects failure modes on the sensor signal interface 315A and on the electronic controller itself, but also to detect failure modes originating from PSensor 303A. At table 321B, standard functions linked each of the standard components/interfaces is collected and linked to the schematic elements.

Figure 3C:
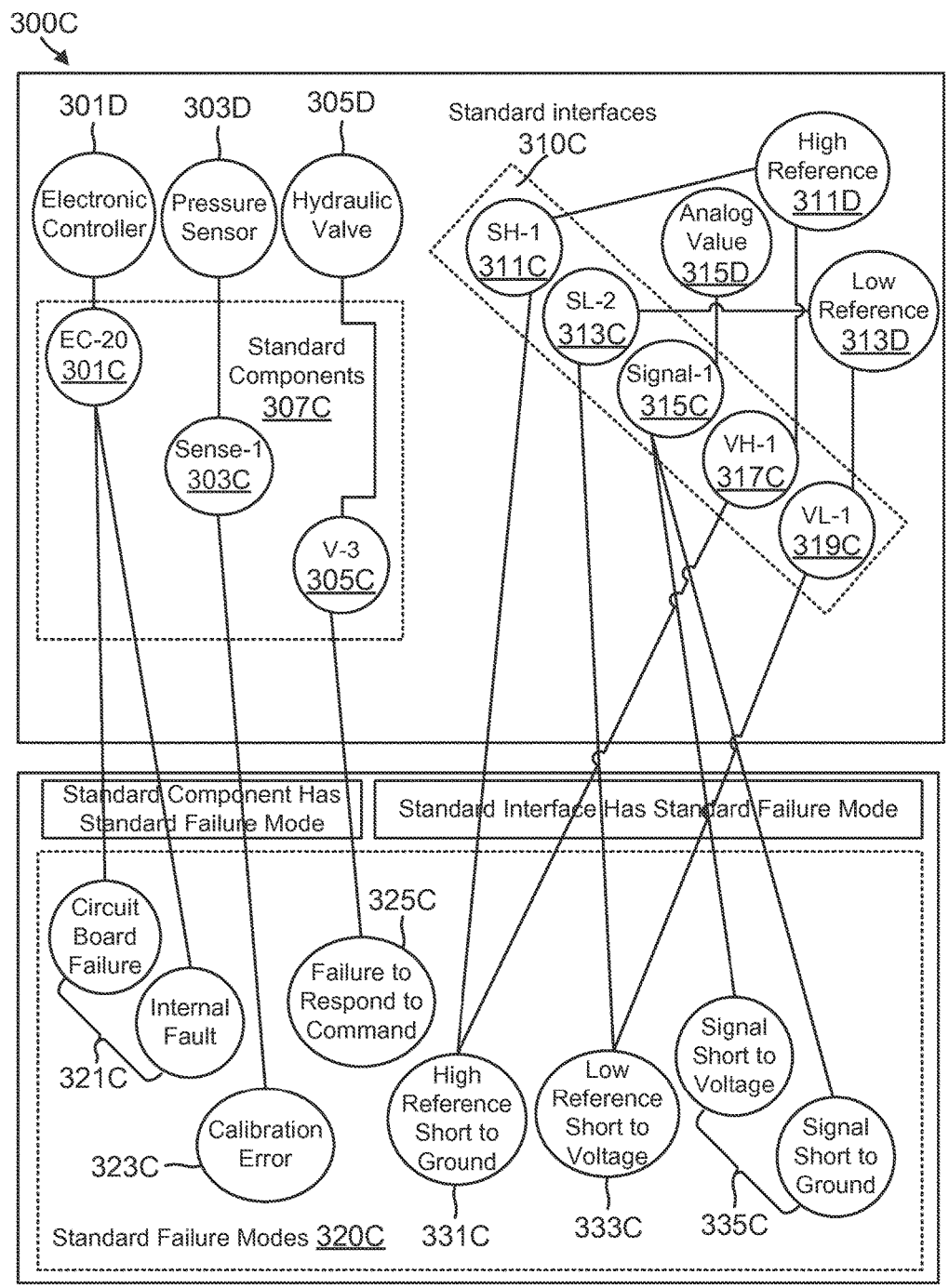
FIG. 3C illustrates an exemplary process for generating failure information from linked standard components and standard interfaces, and their relationships.

FIG. 3C illustrates the relationships of the standard components and standard interfaces and their linked standard failure modes 300C. The diagram comprises standard components 307C, standard interfaces 310C, and standard failure modes 320C.

Standard components 307C include standard component for pressure controller, "EC-20" 301C. EC-20 301C is linked to component type Electronic Controller at 301D. EC-20 301C is also linked to standard failure modes, circuit board failure and internal fault 321C. Standard component for PSensor, "Sense-1" 303C, is linked to component type pressure sensor 303D. Sense-1 303C is linked to calibration error 323C standard failure mode. The standard component for HValve, "V-3" 305C, is linked to component type hydraulic valve 305D. V-3 305C is also linked to standard failure mode failure to respond to command 325C.

Standard interfaces 310C include the standard interface for Sensor High Reference, SH-1 311C. SH-1 311C is linked to interface type high reference 311D. Standard interface SH-1 311C is also linked to standard failure mode high reference short to ground 331C. The standard interface for sensor low reference, SL-2 313C is linked to interface type low reference 313D. Standard interface SL-2, 313C is linked to standard failure mode low reference short to voltage 333C. The standard interface for sensor signal, Signal-1 315C, is linked to interface type analog value 315D. Standard interface signal-1 315C is linked to standard failure modes 335C signal short to voltage and signal short to ground. The standard interface for valve high reference, VH-1 317C, is linked to interface type high reference 311D. VH-1 317C is linked to standard failure mode high reference short to ground 331C. Both VH-1 317C and SH-1 311C share the same interface type high reference 311D, and standard failure mode high reference short to ground 331C. The standard interface of valve low reference, VL-1 319C, is linked to interface type low reference 313D. Standard interface VL-1 319C is linked to standard failure mode low reference short to voltage 333C. VL-1 319C and SL-2 313C share the same interface type low reference 313D, and standard failure mode low reference short to voltage 333C.

Figure 3D:
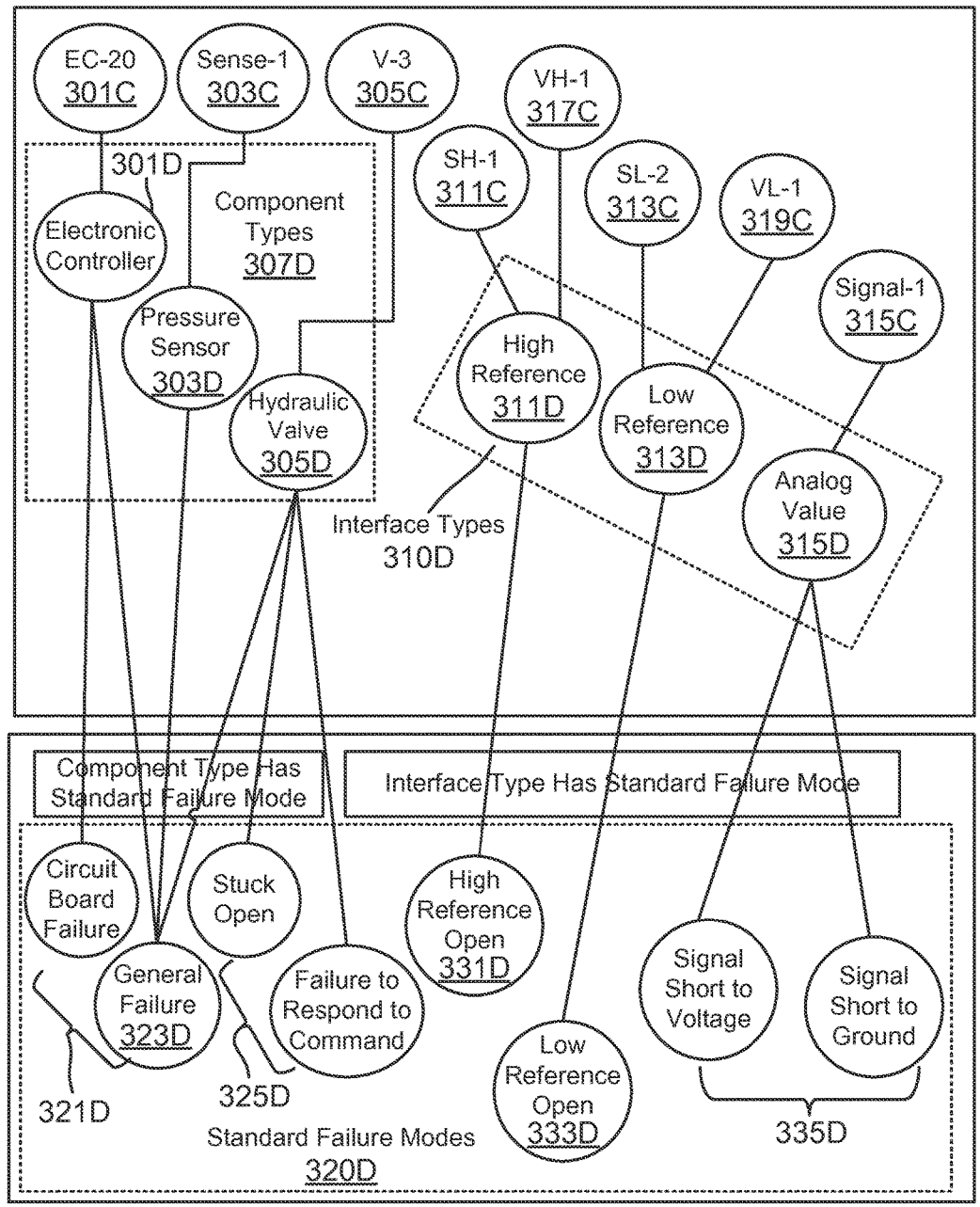
FIG. 3D illustrates an exemplary process for generating a failure information from linked component types and interface types.

FIG. 3D illustrates the relationships of component types and interface types, and their linked standard failure modes 300D. The diagram comprises component types 307D, interface types 310D, and standard failure modes 320D.

Component types 307D include electronic controller 301C, pressure sensor 303D, and hydraulic valve 305D. Electronic controller 301D is linked to standard component EC-20 301C, and has standard failure modes circuit board failure and general failure 321D. Pressure sensor 303D is linked to standard component sense-1 303C, and has standard failure mode general failure 323D. Hydraulic valve 305D is linked to standard component V-3 305C, and has standard failure modes general failure, stuck open, and failure to respond to command. Standard component for PSensor, "Sense-1" 303C, is linked to component type Pressure Sensor 303D. Sense-1 303C is linked to calibration error 323C standard failure mode. The standard component for HValve, "V-3" 305C, is linked to component type Hydraulic Valve 305D. V-3 305C is also linked to standard failure mode failure to respond to command 325C. The standard failure mode general failure is shared between all three component types 301D, 303D, and 305D.

Figure 3E:
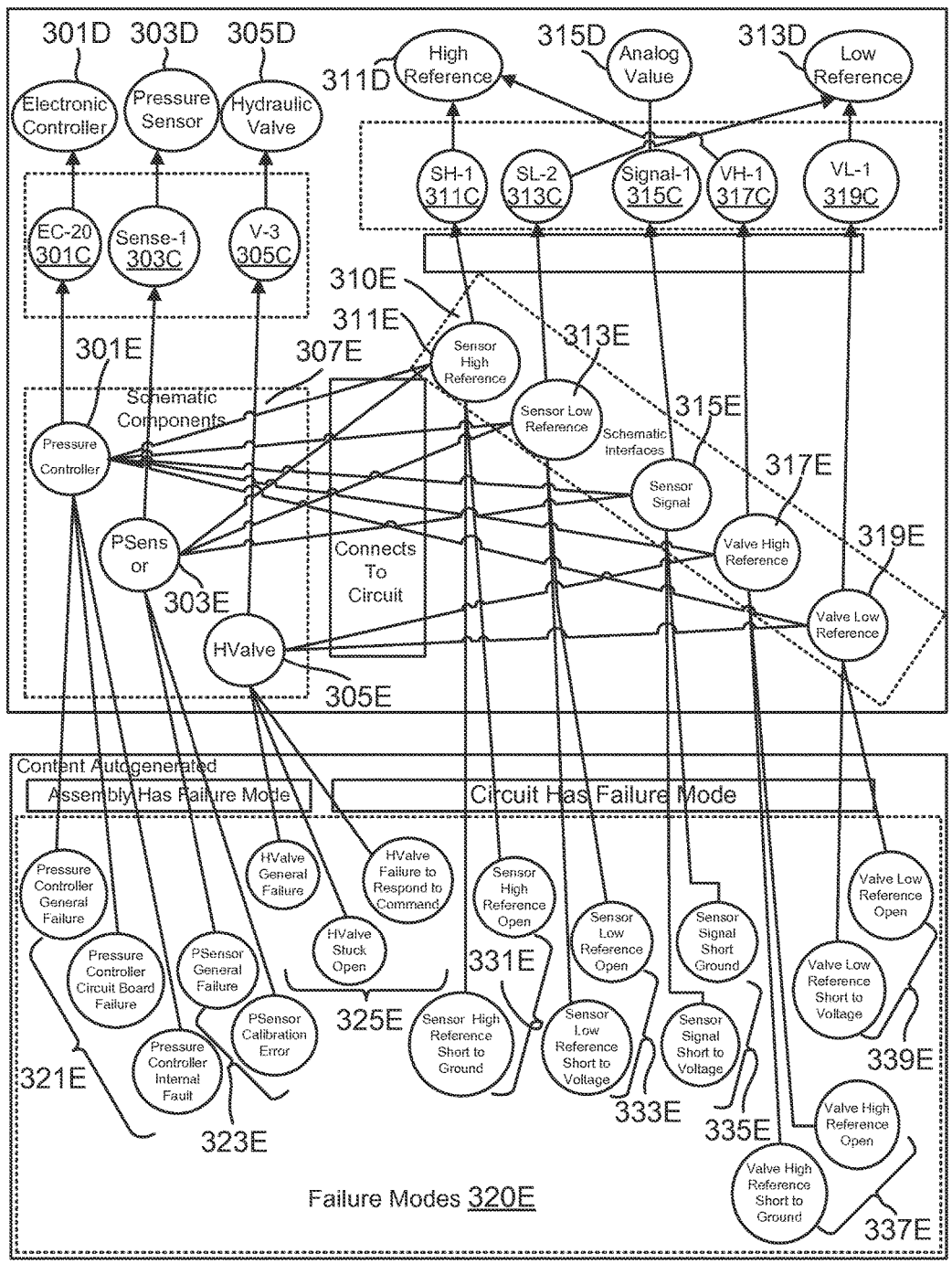
FIG. 3E illustrates an exemplary process for generating a fault model from the failure information generated in FIGS. 3C and 3D.

FIG. 3E illustrates the relationships and failure modes of a fault model as constructed from the failure information generated in FIGS. 3C and 3D. The schematic components of the network diagram include pressure controller 301E, PSensor 303E, and HValve 305E. Schematic interfaces include sensor high reference 311E, sensor low reference 313E, sensor signal 315E, valve high reference 317E, and valve low reference 319E. Failure modes 320E include the sets of failure modes 321E-325E connected to each component 307E, and failure modes 331E-339E connected to interfaces 310E.

Pressure controller 301E is connected to standard component EC-20 301C having component type electronic controller 301D. Pressure controller 301E is connected to the failure modes pressure controller general failure, pressure controller circuit board failure, and pressure controller internal fault 321E. Failure modes 321E are the standard failure modes of EC-20 301C and electronic controller 301D as mapped specifically to the technical specifications of pressure controller 301E. Technical specifications can include, but are not limited to specific configurations, build materials, operating conditions, and tolerances. Standard failure modes are mapped to the schematic elements described below in a similar manner.

PSensor 303E is connected to standard component sense-1 303C and has component type pressure sensor 303D. PSensor 303E is connected to failure modes PSensor general failure and PSensor calibration error 323E. Failure modes 323E are the standard failure modes of sense-1 303C and pressure sensor 303D as mapped specifically to PSensor 303E, as described above with respect to pressure controller 301E.

HValve 305E is connected to standard component V-3 305C and has component type hydraulic valve 305D. HValve 305E is connected to failure modes HValve general failure, HValve stuck open, and HValve failure to respond to command 325E. Failure modes 325E are the standard failure modes of V-3 305C and hydraulic valve 305D as mapped specifically to HValve 305E.

Sensor high reference 311E is connected standard interface SH-1 311C having interface type high reference 311D. Sensor high reference 311E has failure modes sensor high reference short to ground and sensor high reference open 331E. Failure modes 331E are the standard failure modes of SH-1 311C and high reference 311D as mapped specifically to schematic interface sensor high reference 311E.

Sensor low reference 313E is connected to standard interface SL-2 313C having interface type low reference 313D. Sensor low reference 313E has failure modes sensor low reference short to voltage and sensor low reference open 333E. Failure modes 333E the standard failure modes of SL-2 313C and low reference 313D as mapped to schematic interface sensor low reference 313E.

Sensor signal 315E is connected to standard interface signal-1 315C and has interface type analog value 315D. Sensor signal 315E has failure modes sensor signal short to voltage and sensor signal short to ground 335E. Failure modes 335E are the standard failure modes of signal-1 315C and analog value 315D as mapped specifically to sensor signal 315E.

Valve high reference 317E is connected to standard interface VH-1 317C having interface type high reference 311D. Valve high reference 317E has failure modes valve high reference short to ground and valve high reference open 337E. Failure modes 337E are the standard failure modes of VH-1 317C and high reference 311D as mapped to valve high reference 317E.

Valve low reference 319E is connected to standard interface VL-1 319C, and has interface type low reference 313D. Valve low reference 319E has failure modes valve low reference short to voltage and valve low reference open 339E. Failure modes 339E are the standard failure modes of VL-1 319C and low reference 313D as mapped to valve low reference 319E.

The relationship between schematic components and schematic interfaces is also shown. Pressure controller 301E is connected to sensor high reference 311E, sensor low reference 313E, sensor signal 315E, valve high reference 317E, and valve low reference 319E. PSensor 303E is connected to sensor high reference 311E, sensor low reference 313E, and sensor signal 315E. Thus, it can be seen pressure controller 301E and PSensor 303E are connected by interfaces sensor high reference 311E, sensor low reference 313E, and sensor signal 315E. HValve 305E is connected to valve high reference 317E, and valve low reference 319E. Thus, HValve 305E is connected to pressure controller 301E via interfaces valve high reference 317E and valve 319E.

In other embodiments, standard tests that are linked to each of the standard components 307C, component types 307D, standard interfaces 310C, interface types 310D, and standard failure modes 320C, 320D are linked to schematic components 307E and schematic interfaces 310E as described with respect to FIG. 3B. In further embodiments, affected functions may also be linked to schematic elements 307E and 310E as the standard functions of each standard components/interfaces 307C/310C mapped to the schematic elements 307E and 310E, as described with respect to FIG. 3B.

Figure 4:
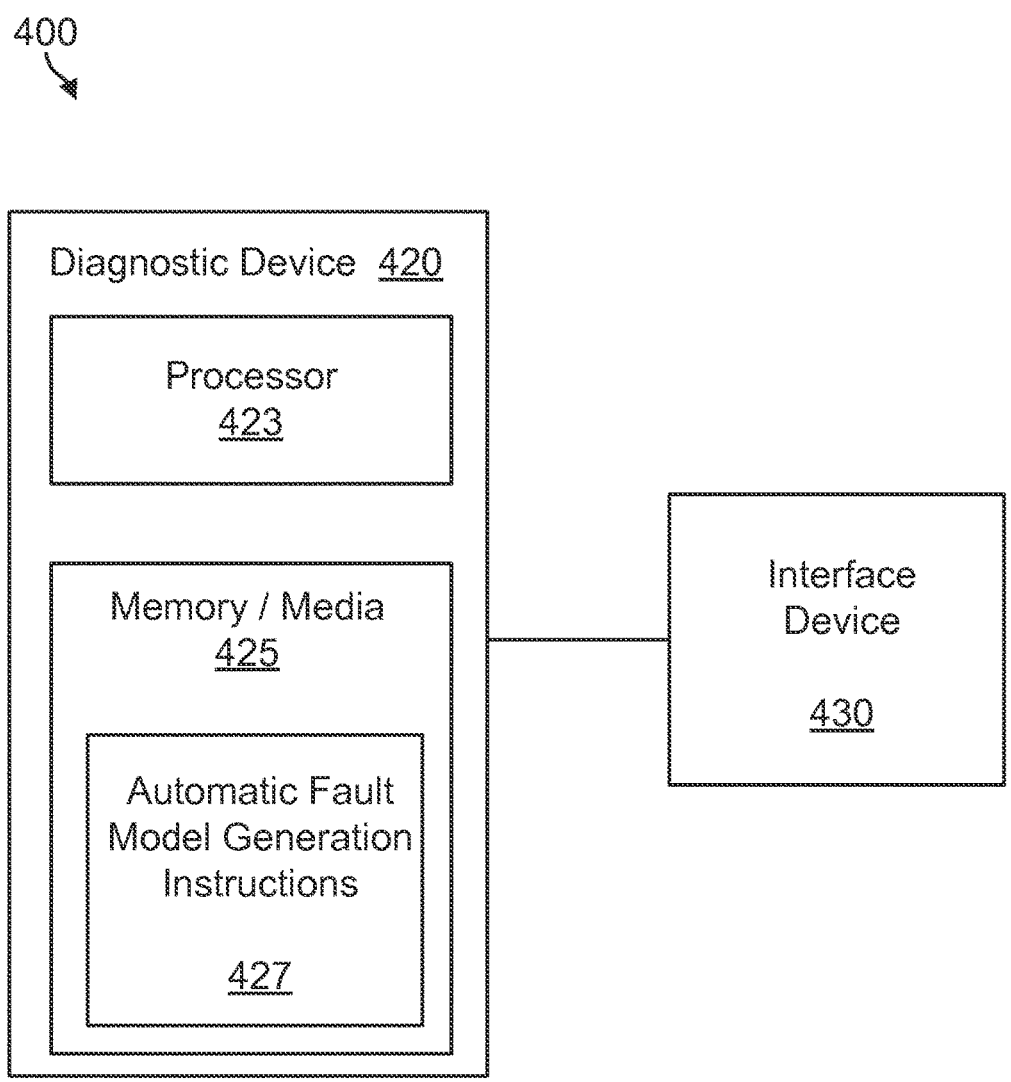
FIG. 4 is a block diagram of an exemplary system for automatically generating a fault model from a network diagram.

FIG. 4 is a system block diagram illustrating an exemplary system for automatically generating a fault model from a network diagram 400. A diagnostic device 420 comprises a processor 423 coupled to computer readable memory/media 425 containing automatic fault model generation instructions 427. The processor 423 executes automatic fault model generation instructions 427 in performing functionality discussed herein to automatically generate a fault model based on a network diagram. The instructions 427 are typically stored on any appropriate computer readable medium used for storage of computer readable instructions or data structures. The computer readable medium can be implemented as any available media that can be accessed by a general purpose or special purpose computer or processor, or any programmable logic device. Suitable computer readable memory includes any available media that can be accessed by a general purpose or special purpose computer or processor, or any programmable logic device. Suitable processor-readable media may include storage or memory media such as magnetic or optical media. For example, suitable processor-readable media may include storage or memory media such as, but not limited to, conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc.

In operation, a network diagram is supplied to the diagnostic device 420. In one embodiment, the network diagram can be created or designed in a software program for the purposes of fault model generation. In other embodiments, the network diagram can be supplied and read optically by the diagnostic device 420 via an interface device 430. For example, a network diagram may be electronically scanned or otherwise presented as a digital image to the diagnostic device 420. The processor 423 then executes automatic fault model generation instructions 427 to generate a fault model. Interface device 430 configured to interface with processor 423 to provide network diagrams, user input, and results indicative of the fault model. In one embodiment, the interface device may be a display and keyboard. Suitable exemplary displays include, but are not limited to, a cathode ray tube (CRT) display, an active liquid crystal display (LCD), a passive matrix LCD, a light emitting diode (LED) display, or plasma display unit. In further embodiments, the interface device may include a digital scanner or camera capable of reading network diagrams, a printer for printing out information related to the fault model, or speakers capable of aurally indicating a result indicative of the fault model. Results indicative of the fault model may include instructions for testing or repair, or may include diagnosis of a reported problem.

Although specific embodiments have been illustrated and described herein, it will be appreciated by those of ordinary skill in the art that any arrangement, which can achieve the same purpose, may be substituted for the specific embodiments shown. Therefore, it is manifestly intended that this invention be limited only by the claims and the equivalents thereof.

EXAMPLE EMBODIMENTS

Example 1 includes a method of automatically generating a fault model from a network diagram comprising: parsing a network diagram to identify schematic components and schematic interfaces; mapping each schematic component to a respective standard component; mapping each schematic interface to a respective standard interface; generating component failure information for each schematic component based on the respective standard component, wherein component failure information includes standard failure modes of the respective standard component; generating interface failure information for each schematic interface based on the respective standard interface, wherein interface failure information includes standard failure modes of the respective standard interface; and constructing a fault model specific to the network diagram based on the component failure information and interface failure information.

Example 2 includes the method of example 1, wherein: component failure information includes at least one of: a standard test linked to the respective standard component; a standard test linked to the standard failure modes of the respective standard component; a standard function linked to the respective standard component; and interface failure information includes at least one of: a standard test linked to the respective standard interface; a standard test linked to the standard failure modes of the respective standard interface; a standard function linked to the respective standard interface.

Example 3 includes the method of any of examples example 1-2 further comprising: defining standard components, wherein standard components are found in a pre-populated database, found in a customizable database, or defined by the user; and defining standard interfaces, wherein standard interfaces are found in a pre-populated database, found in a customizable database, or defined by the user.

Example 4 includes the method of any of examples 1-3 further comprising: defining component types, wherein component types are found in a pre-populated database, found in a customizable database, or defined by the user; linking standard components to a respective component type; defining interface types, wherein interface types are found in a pre-populated database, found in a customizable database, or defined by the user; and linking standard interfaces are to an interface type.

Example 5 includes the method of any of examples 1-4 further comprising: mapping each schematic component to a respective component type, wherein the component type is linked to the respective standard component; and mapping each schematic interface to a respective interface type, wherein the interface type is linked to the respective standard interface.

Example 6 includes the method of any of examples 1-5, wherein the component failure information includes standard failure modes of the respective component type, and the interface failure information includes standard failure modes of the respective interface type.

Example 7 includes the method of any of examples 1-6, wherein: component failure information includes at least one of: a standard test linked to the respective component type; a standard test linked to the standard failure modes of the respective component type; and interface failure information includes at least one of: a standard test linked to the respective interface type; a standard test linked to the standard failure modes of the respective interface type.

Example 8 includes the method of any of examples 1-7, wherein: component failure information includes supplementary records, wherein supplementary records include service records, operator complaints, or other information that may not inherently be linked to the standard component; and interface failure information includes supplementary records, wherein supplementary records include service records, operator complaints, or other information that may not inherently be linked to the standard interface.

Example 9 includes the method of any of examples 1-8, further comprising: defining standard failure modes, wherein standard failure modes are found in a pre-populated database, found in a customizable database, or defined by the user; linking standard failure modes to the standard components and standard interfaces; defining standard tests, wherein standard tests are found in a pre-populated database, found in a customizable database, or defined by the user; linking standard tests to the standard components and standard interfaces; defining standard functions, wherein standard functions are found in a pre-populated database, found in a customizable database, or defined by the user; and linking standard functions to the standard components and standard interfaces.

Example 10 is a system for automatically generating a fault model from a network diagram comprising: a diagnostic device configured to: parse a network diagram to identify schematic components and schematic interfaces; map each schematic component to a respective standard component; map each schematic interface to a respective standard interface; generate component failure information for each schematic component based on the respective standard component, wherein component failure information includes standard failure modes of the respective standard component; generate interface failure information for each schematic interface based on the respective standard interface, wherein interface failure information includes standard failure modes of the respective standard interface; and construct a fault model specific to the network diagram based on component failure information and interface failure information; an interface device coupled to the diagnostic device, the interface device configured to provide information based on the fault model.

Example 11 includes the system of example 10, wherein the interface device is configured to provide the diagnostic device with a network diagram.

Example 12 includes the system of any of examples 10-11, wherein the component failure information includes at least one of: a standard test linked to the respective standard component; a standard test linked to the standard failure modes of the respective standard component; a standard function linked to the respective standard component; and interface failure information includes at least one of: a standard test linked to the respective standard interface; a standard test linked to the standard failure modes of the respective standard interface; a standard function linked to the respective standard interface.

Example 13 includes the system of any of examples 10-12, wherein the diagnostic device is configured to: map each schematic component to a respective component type, wherein the component type is linked to the respective standard component; and map each schematic interface to a respective interface type, wherein the interface type is linked to the respective standard interface.

Example 14 includes the system of any of examples 10-13, wherein the component failure information includes standard failure modes of the respective component type, and the interface failure information includes standard failure modes of the respective interface type.

Example 15 includes the system of any of examples 10-14, wherein: component failure information includes at least one of: a standard test linked to the respective component type; a standard test linked to the standard failure modes of the respective component type; and interface failure information includes at least one of: a standard test linked to the respective interface type; a standard test linked to the standard failure modes of the respective interface type.

Example 16 includes the system of any of examples 10-15, wherein: component failure information includes supplementary records, wherein supplementary records include service records, operator complaints, or other information that may not inherently be linked to the standard component; and interface failure information includes supplementary records, wherein supplementary records include service records, operator complaints, or other information that may not inherently be linked to the standard interface.

Example 17 is a program product comprising a processor readable medium on which program instructions are embodied, wherein the program instructions are configured, when executed by at least one programmable processor, to cause the at least one programmable processor to: parse a network diagram to identify schematic components and schematic interfaces; map each schematic component to a respective standard component; map each schematic interface to a respective standard interface; generate component failure information for each schematic component based on the respective standard component, wherein component failure information includes standard failure modes of the respective standard component; generate interface failure information for each schematic interface based on the respective standard interface, wherein interface failure information includes standard failure modes of the respective standard interface; and construct a fault model specific to the network diagram based on component failure information and interface failure information.

Example 18 includes the program product of example 17, wherein the program instructions are configured to cause the at least one programmable processor to: define standard components, wherein standard components are found in a pre-populated database, found in a customizable database, or defined by the user; and define standard interfaces, wherein standard interfaces are found in a pre-populated database, found in a customizable database, or defined by the user.

Example 19 includes the program product of any of examples 17-18, wherein the program instructions are configured to cause the at least one programmable processor to: define component types, wherein component types are found in a pre-populated database, found in a customizable database, or defined by the user; link standard components to a respective component type; define interface types, wherein interface types are found in a pre-populated database, found in a customizable database, or defined by the user; and link standard interfaces are to an interface type.

Example 20 includes the program product of any of examples 17-19, wherein the program instructions are configured to cause the at least one programmable processor to: define standard failure modes, wherein standard failure modes are found in a pre-populated database, found in a customizable database, or defined by the user; link standard failure modes to the standard components and standard interfaces; define standard tests, wherein standard tests are found in a pre-populated database, found in a customizable database, or defined by the user; link standard tests to the standard components and standard interfaces; define standard functions, wherein standard functions are found in a pre-populated database, found in a customizable database, or defined by the user; and linking standard functions to the standard components and standard interfaces

What is claimed is:

1. A method of automatically generating a fault model from a network diagram comprising:
   parsing a network diagram to identify schematic components and schematic interfaces;
   mapping each schematic component to a respective standard component;
   mapping each schematic interface to a respective standard interface;
   generating component failure information for each schematic component based on the respective standard component, wherein component failure information includes standard failure modes of the respective standard component;
   generating interface failure information for each schematic interface based on the respective standard interface, wherein interface failure information includes standard failure modes of the respective standard interface; and
   constructing a fault model specific to the network diagram based on component failure information and interface failure information.

2. The method of claim 1, wherein:
   component failure information includes at least one of:
     a standard test linked to the respective standard component;
     a standard test linked to the standard failure modes of the respective standard component;
     a standard function linked to the respective standard component; and interface failure information includes at least one of:
     a standard test linked to the respective standard interface;
     a standard test linked to the standard failure modes of the respective standard interface;
     a standard function linked to the respective standard interface.

3. The method of claim 1 further comprising:
   defining standard components, wherein standard components are found in a pre-populated database, found in a customizable database, or defined by the user; and
   defining standard interfaces, wherein standard interfaces are found in a pre-populated database, found in a customizable database, or defined by the user.

4. The method of claim 1 further comprising:
   defining component types, wherein component types are found in a pre-populated database, found in a customizable database, or defined by the user;
   linking standard components to a respective component type;

defining interface types, wherein interface types are found in a pre-populated database, found in a customizable database, or defined by the user; and linking standard interfaces are to an interface type.

5. The method of claim 1 further comprising:

mapping each schematic component to a respective component type, wherein the component type is linked to the respective standard component; and mapping each schematic interface to a respective interface type, wherein the interface type is linked to the respective standard interface.

6. The method of claim 5, wherein the component failure information includes standard failure modes of the respective component type, and the interface failure information includes standard failure modes of the respective interface type.

7. The method of claim 6, wherein:

component failure information includes at least one of:
a standard test linked to the respective component type;
a standard test linked to the standard failure modes of the respective component type; and interface failure information includes at least one of:
a standard test linked to the respective interface type;
a standard test linked to the standard failure modes of the respective interface type.

8. The method of claim 1, wherein:

component failure information includes supplementary records, wherein supplementary records include service records, operator complaints, or other information that may not inherently be linked to the standard component; and interface failure information includes supplementary records, wherein supplementary records include service records, operator complaints, or other information that may not inherently be linked to the standard interface.

9. The method of claim 1, further comprising:

defining standard failure modes, wherein standard failure modes are found in a pre-populated database, found in a customizable database, or defined by the user;

linking standard failure modes to the standard components and standard interfaces;

defining standard tests, wherein standard tests are found in a pre-populated database, found in a customizable database, or defined by the user;

linking standard tests to the standard components and standard interfaces;

defining standard functions, wherein standard functions are found in a pre-populated database, found in a customizable database, or defined by the user; and linking standard functions to the standard components and standard interfaces.

10. A system for automatically generating a fault model from a network diagram comprising:

a diagnostic device configured to:
parse a network diagram to identify schematic components and schematic interfaces;
map each schematic component to a respective standard component;
map each schematic interface to a respective standard interface;
generate component failure information for each schematic component based on the respective standard component, wherein component failure information includes standard failure modes of the respective standard component;
generate interface failure information for each schematic interface based on the respective standard interface, wherein interface failure information includes standard failure modes of the respective standard interface; and
construct a fault model specific to the network diagram based on component failure information and interface failure information;

an interface device coupled to the diagnostic device, the interface device configured to provide information based on the fault model.

11. The system of claim 10, wherein the interface device is configured to provide the diagnostic device with a network diagram.

12. The system of claim 10, wherein the component failure information includes at least one of:
a standard test linked to the respective standard component;
a standard test linked to the standard failure modes of the respective standard component;
a standard function linked to the respective standard component; and interface failure information includes at least one of:
a standard test linked to the respective standard interface;
a standard test linked to the standard failure modes of the respective standard interface;
a standard function linked to the respective standard interface.

13. The system of claim 10, wherein the diagnostic device is configured to:

map each schematic component to a respective component type, wherein the component type is linked to the respective standard component; and map each schematic interface to a respective interface type, wherein the interface type is linked to the respective standard interface.

14. The system of claim 13, wherein the component failure information includes standard failure modes of the respective component type, and the interface failure information includes standard failure modes of the respective interface type.

15. The system of claim 13, wherein:

component failure information includes at least one of:
a standard test linked to the respective component type;
a standard test linked to the standard failure modes of the respective component type; and interface failure information includes at least one of:
a standard test linked to the respective interface type;
a standard test linked to the standard failure modes of the respective interface type.

16. The system of claim 10, wherein:

component failure information includes supplementary records, wherein supplementary records include service records, operator complaints, or other information that may not inherently be linked to the standard component; and interface failure information includes supplementary records, wherein supplementary records include service records, operator complaints, or other information that may not inherently be linked to the standard interface.

17. A program product comprising a non-transitory processor readable medium on which program instructions are embodied, wherein the program instructions are configured, when executed by at least one programmable processor, to cause the at least one programmable processor to:

parse a network diagram to identify schematic components and schematic interfaces;
map each schematic component to a respective standard component;
map each schematic interface to a respective standard interface;
generate component failure information for each schematic component based on the respective standard component, wherein component failure information includes standard failure modes of the respective standard component;
generate interface failure information for each schematic interface based on the respective standard interface, wherein interface failure information includes standard failure modes of the respective standard interface; and
construct a fault model specific to the network diagram based on component failure information and interface failure information.

18. The program product of claim 17, wherein the program instructions are configured to cause the at least one programmable processor to:
define standard components, wherein standard components are found in a pre-populated database, found in a customizable database, or defined by the user; and
define standard interfaces, wherein standard interfaces are found in a pre-populated database, found in a customizable database, or defined by the user.

19. The program product of claim 17, wherein the program instructions are configured to cause the at least one programmable processor to:
define component types, wherein component types are found in a pre-populated database, found in a customizable database, or defined by the user;
link standard components to a respective component type;
define interface types, wherein interface types are found in a pre-populated database, found in a customizable database, or defined by the user; and
link standard interfaces are to an interface type.

20. The program product of claim 17, wherein the program instructions are configured to cause the at least one programmable processor to:
define standard failure modes, wherein standard failure modes are found in a pre-populated database, found in a customizable database, or defined by the user;
link standard failure modes to the standard components and standard interfaces;
define standard tests, wherein standard tests are found in a pre-populated database, found in a customizable database, or defined by the user;
link standard tests to the standard components and standard interfaces;
define standard functions, wherein standard functions are found in a pre-populated database, found in a customizable database, or defined by the user; and linking standard functions to the standard components and standard interfaces.

* * * * *